(12) United States Patent
Fastert et al.

(10) Patent No.: US 11,548,213 B2
(45) Date of Patent: Jan. 10, 2023

(54) ADDITIVE MANUFACTURING DEVICE, ADDITIVE MANUFACTURING METHOD, AND PROFILE ROD THEREFOR

(71) Applicant: Airbus Operations GmbH, Hamburg (DE)

(72) Inventors: Claus Fastert, Hamburg (DE); Dirk Elbracht, Hamburg (DE); Johannes Born, Hamburg (DE); Konstantin Schubert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 133 days.

(21) Appl. No.: 16/829,534

(22) Filed: Mar. 25, 2020

(65) Prior Publication Data
US 2020/0307069 A1 Oct. 1, 2020

(30) Foreign Application Priority Data

Mar. 28, 2019 (DE) ...................... 10 2019 108 123.8

(51) Int. Cl.
*B29C 64/118* (2017.01)
*B29C 64/321* (2017.01)
(Continued)

(52) U.S. Cl.
CPC .......... *B29C 64/118* (2017.08); *B29C 64/255* (2017.08); *B29C 64/321* (2017.08); *B33Y 10/00* (2014.12); *B33Y 30/00* (2014.12)

(58) Field of Classification Search
CPC ... B29C 64/118; B29C 64/255; B29C 64/321; B33Y 30/00
See application file for complete search history.

(56) References Cited

U.S. PATENT DOCUMENTS

2017/0210074 A1* 7/2017 Ueda ...................... B29C 64/393
2018/0079135 A1 3/2018 Duis et al.
(Continued)

FOREIGN PATENT DOCUMENTS

| WO | 2016142472 A1 | 9/2016 |
| WO | 2018163007 A1 | 9/2018 |

OTHER PUBLICATIONS

German Search Report; priority document.

*Primary Examiner* — Joseph S Del Sole
*Assistant Examiner* — Mohamed K Ahmed Ali
(74) *Attorney, Agent, or Firm* — Greer, Burns & Crain, Ltd.

(57) ABSTRACT

A method of using solid profile rods instead of the usual filament coils for additive manufacturing methods such as 3D printing for industrial applications such as aircraft manufacturing, and to enable a more rapid production of fiber-composite components. The additive manufacturing device, or the 3D printer which generates the component layer by layer, respectively, comprises a material magazine in which a plurality of profile rods are stored. The profile rods are pre-tailored and are adapted to the component layer by layer. The profile rods, when printing, are successively retrieved from the material magazine and, by way of an infeed installation, guided to the nozzle of the additive manufacturing installation and subsequently applied to the printing bed so as to form the component layer by layer.

8 Claims, 2 Drawing Sheets

(51) Int. Cl.
*B29C 64/255* (2017.01)
*B33Y 10/00* (2015.01)
*B33Y 30/00* (2015.01)

(56) References Cited

U.S. PATENT DOCUMENTS

2018/0304532 A1 10/2018 Burnham et al.
2020/0016840 A1 1/2020 Bracha et al.

* cited by examiner

FIG 4 Detail B

ADDITIVE MANUFACTURING DEVICE, ADDITIVE MANUFACTURING METHOD, AND PROFILE ROD THEREFOR

CROSS-REFERENCES TO RELATED APPLICATIONS

This application claims the benefit of the German patent application No. 10 2019 108 123.8 filed on Mar. 28, 2019, the entire disclosures of which are incorporated herein by way of reference.

FIELD OF THE INVENTION

The invention relates to an additive manufacturing device which is configured for the additive manufacturing of a component. The invention furthermore relates to an additive manufacturing method, and to a profile rod for use in the method.

BACKGROUND OF THE INVENTION

The most common 3D printing application uses plastic materials in the so-called fused filament fabrication (FFF) in which a thermoplastic filament is melted and applied to a printing bed. The filament can contain additives or reinforcements. The filament cools and re-solidifies on the printing bed.

The filament is usually provided as a coil which is fitted close to the printing head, or at an immovable position of the 3D printer. The filament herein is fed to the printing head by way of an adequate guide system, for example by means of a Bowden cable. This enables the use of comparatively long filaments but is associated with certain limitations in terms of the filaments used.

One limitation can thus be that the filaments used have a rather small diameter (usually between 0.8 mm and less than 3 mm), so as to permit the winding and guiding by way of acceptable bending radii. The achievable deposition rates can be limited by virtue of the small diameter. Alternative methods such as, for example, the use of yarns mixed in, or an in-situ impregnation, can be significantly more complex in terms of the part quality that can be obtained, in particular by virtue of the additional complexity of the method.

It can additionally be required for fiber-reinforced filaments that a cutting operation is to be carried out by virtue of the continuous configuration of the filaments, for example when a part cannot be generated in one single uninterrupted fiber path, or filament path, respectively. While cutting devices of this type exist, this approach may be less desirable because the cutting of the fibers may be a limitation in terms of the continuous operation of the 3D printer. This applies, in particular, when materials such as carbon fibers are used.

In another case, the accumulation of degraded thermoplastic material at the exit of the printing nozzle can represent a problem.

Furthermore, the thicker the filament, the longer the filament has to be heated (or the method has to be decelerated) in order to guarantee melting through of the filament. The risk and occurrence of degradation can be increased on account thereof. For example, the degradation changes the viscosity of the material such that the latter can accumulate on the nozzle or be squeezed into the component, this being undesirable and potentially compromising the printing quality. This is usually more critical in so-called "(endless) fiber-reinforced printing" in which the cleaning of the nozzle is more complicated than in the case of an endless filament which cannot be cut directly at the nozzle.

Figure 1:
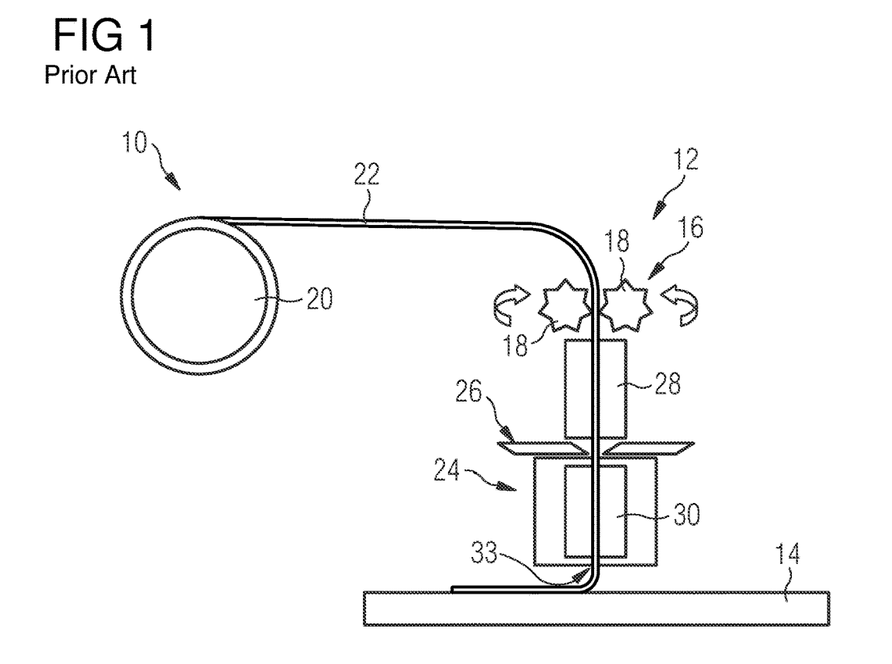
FIG. 1 shows an exemplary embodiment of a known additive manufacturing device.

FIG. 1 hereunder shows a schematic drawing of a printing device 10 for layered melting, with and without fiber reinforcements. The printing device 10 comprises a printing head 12 which is disposed so as to be movable relative to a printing bed 14. The printing head 12 can contain a filament drive installation 16 so as to move, by means of a plurality of drive wheels 18, a filament 22 that is wound on a coil 20 to the so-called hot end 24. A cutting device 26, by way of which the filament 22 can be chopped, can be provided at a location which in the material flow direction is ahead of the hot end 24. If required, a filament guide 28 can be additionally interposed between the filament drive device 16 and the hot end 24. A heating element 30 which heats the filament 22 to the melting temperature and by way of an exit nozzle 32 deposits the filament 22 on the printing bed 14 is situated at the hot end 24.

The sequence and the functional principle of these components may be dissimilar. The cutting device 26 can also be dispensed with if no endless fiber reinforcement is used.

In general, devices of this type and the deposition rate thereof is limited several tens of grams per hour. Furthermore, a fiber breakage may arise in the fiber-reinforced filament in the case of excessively small bending radii. Usual thicknesses of the filaments for fiber-reinforced filaments are 0.4 mm, for example.

SUMMARY OF THE INVENTION

The invention is based on an object of improving the deposition rate of additive manufacturing devices, in particular when using fiber-reinforced plastic materials.

The invention achieves an additive manufacturing device which is configured for the additive manufacturing of a preferably fiber-reinforced plastic-material component, in particular for an aircraft, wherein the additive manufacturing device comprises an additive manufacturing installation which is configured for generating the component layer by layer, a material magazine for a plurality of profile rods, and an infeed installation which is configured for feeding a profile rod that is introduced into the infeed installation to the additive manufacturing installation.

It is preferable for the infeed installation to comprise an entrance portion which is configured for positioning and/or aligning an introduced profile rod in such a manner that the profile rod is in alignment with an infeed opening of the additive manufacturing installation and/or a profile rod drive installation.

It is preferable for the entrance portion to comprise an infeed duct which tapers in the direction toward the additive manufacturing installation for positioning and/or aligning the introduced profile rod.

It is preferable for the infeed installation to comprise a profile rod drive installation which is configured for acquiring a profile rod, in particular a profile rod that is introduced into the entrance portion, in a form-fitting and/or force-fitting manner, so as to move the introduced profile rod in the direction toward the additive manufacturing installation.

It is preferable for the profile rod drive installation to be configured for positioning and/or aligning an introduced profile rod in such a manner that the introduced profile rod is in alignment with an infeed opening of the additive manufacturing installation.

It is preferable for the profile rod drive installation to comprise at least one drive wheel which is disposed such that the drive wheel acquires an introduced profile rod so as to drive and/or position and/or align the introduced profile rod.

It is preferable for the infeed installation to comprise an infeed tappet which is configured for pushing a profile rod so as to introduce the profile rod into the infeed installation, in particular the entrance portion.

It is preferable for the infeed tappet to be configured for pushing a profile rod out of the material magazine so as to introduce the profile rod into the infeed installation, in particular the entrance portion.

It is preferable for the infeed installation to be configured for conveying profile rods that are situated in the material magazine out of the material magazine and to introduce the profile rods into the infeed installation, in particular, the entrance portion.

It is preferable for the material magazine to be configured in such a manner that profile rods that are situated in the material magazine are able to be introduced into the infeed installation by displacing the profile rods along the longitudinal axis thereof.

It is preferable for the material magazine to be configured in such a manner that profile rods that are situated in the material magazine are able to be introduced into the infeed installation by virtue of the force of the weight of the profile rods and/or of a tappet.

It is preferable for the material magazine to contain a plurality of profile rods, wherein each profile rod is pre-tailored according to at least one of the following properties, specifically a profile rod length, a profile rod cross section, a profile rod diameter, and a profile rod material.

It is preferable for the additive manufacturing device, in particular the material magazine, to comprise a cooling unit which is configured for cooling the profile rods, in particular the profile rods that are situated in the material magazine, so as to keep the profile rods in a dimensionally stable state.

The manufacturing device preferably comprises a profile rod rotating installation which is configured for rotating a profile rod about the longitudinal axis thereof.

It is preferable for the infeed installation to comprise the profile rod rotating installation, and/or for the entrance portion and/or the profile rod drive installation to comprise the profile rod rotating installation.

It is preferable for the additive manufacturing installation to comprise a heating duct which is delimited by an infeed opening and an exit opening and which is adjacent to a heating region, wherein the heating region is configured for melting a profile rod that is situated in the heating duct so as to obtain a molten mass.

It is preferable for the infeed opening to face the infeed installation so as to receive a profile rod in the heating duct, wherein the exit opening faces away from the infeed installation so as to apply the molten mass to a printing bed or a material layer.

It is preferable for the additive manufacturing installation to comprise a cooling installation which is configured for cooling the molten mass that is applied to a printing bed or a material layer to below the melting point of the molten mass.

The manufacturing device preferably comprises a printing bed which is disposed in such a manner that the component by means of the additive manufacturing installation is able to be generated on the printing bed.

It is preferable for the printing bed to be heatable.

The manufacturing device preferably comprises a cleaning installation which is configured for cleaning the additive manufacturing installation.

It is preferable for the cleaning installation to be configured for cleaning the heating duct and/or the exit opening.

It is preferable for the cleaning installation in part to be disposed on the infeed tappet and/or in part to be disposed on a separate cleaning tappet.

It is preferable for the cleaning installation to comprise a wiping region for removing thermoplastic residue on the additive manufacturing installation.

It is preferable for the wiping region at least in part to be provided on the printing bed.

The invention furthermore achieves an additive manufacturing method for producing a preferably fiber-reinforced plastic-material component layer by layer, in particular for an aircraft, wherein the method comprises the following steps:

pre-tailoring at least one profile rod so as to correspond to at least one material layer of a plurality of material layers which conjointly form the plastic-material component;

generating the material layer from the pre-tailored profile rod by melting the profile rod and applying the melt to a printing bed or a preceding material layer; and carrying out step b) until the material layers form the plastic-material component.

It is preferable for the manufacturing method to be carried out by a preferred manufacturing device described herein.

It is preferable, in particular in step a), for a first profile rod from a first profile rod material, and a second profile rod from a second profile rod material which is dissimilar to the first profile rod material, to be pre-tailored.

It is preferable for the first profile rod material and/or the second profile rod material to be selected from a group which includes:

thermoplastic polymers which are composed of only one polymer;

thermoplastic polymer blends which are composed of at least two dissimilar polymers; and thermoplastic mixed materials which are composed of at least one thermoplastic polymer, or one thermoplastic polymer blend, and fibers.

It is preferable for the thermoplastic polymer to be selected from a group which includes polyaryletherketone, polyether ether ketone, and polyether ketone ketone.

It is preferable for the thermoplastic polymer blend to be composed of a thermoplastic polymer, in particular as mentioned before, and of a further polymer, in particular a further thermoplastic polymer as mentioned before, and/or a thermosetting polymer.

It is preferable for the thermoplastic mixed material to be selected from a group which includes fiber-reinforced plastic material and prepreg material.

It is preferable for the first profile rod material and/or the second profile rod material to be selected from a group which includes polymers such as polyaryletherketone, in particular polyether ether ketone and/or polyether ketone ketone, resins, artificial resins, plastic materials, fiber-reinforced plastic materials, and/or prepreg materials.

It is preferable, in particular in step b), for a first material layer to be generated from a first profile rod, wherein a second material layer from a second profile rod is generated on the first material layer.

It is preferable, in particular in step b), for the introduced profile rod to be positioned and/or aligned in such a manner that the profile rod is in alignment with an infeed opening of the additive manufacturing installation and/or a profile rod drive installation.

It is preferable, in particular in step b), for the introduced profile rod to be positioned and/or aligned by means of a tapered infeed duct.

It is preferable, in particular in step b), for the introduced profile rod to be acquired in a form-fitting and/or force-fitting manner, and for the introduced profile rod to be moved in the direction toward the additive manufacturing installation.

It is preferable, in particular in step b), for the introduced profile rod to be positioned and/or aligned in such a manner that the introduced profile rod is in alignment with an infeed opening of the additive manufacturing installation.

It is preferable, in particular in step b), for the profile rod to be introduced into an infeed installation, in particular an entrance portion, by pushing by means of an infeed tappet.

It is preferable, in particular in step b), for the profile rod to be pushed out of a material magazine.

It is preferable, in particular in step b), for the profile rod to be conveyed out of the material magazine and to be introduced into the infeed installation, in particular the entrance portion.

It is preferable, in particular in step b), for the profile rod to be introduced into the infeed installation by displacing the profile rod along the longitudinal axis thereof.

It is preferable, in particular in step b), for the profile rod to be introduced into the infeed installation by virtue of the force of the weight of the profile rod.

It is preferable, in particular in step a), for each profile rod to be pre-tailored according to at least one of the following properties, specifically a profile rod length, a profile rod cross section, a profile rod diameter, and a profile rod material.

It is preferable, in particular in step b), for the profile rod to be rotated about the longitudinal axis thereof so as to prevent any twisting of fibers.

It is preferable, in particular in step b), for the profile rod to be melted so as to obtain a molten mass which is applied.

It is preferable, in particular in step b), for the molten mass to be applied to a printing bed or a material layer.

It is preferable, in particular in step b), for the molten mass that is applied to a printing bed or a material layer to be cooled below the melting point of the molten mass.

It is preferable, in particular in step b), for the plastic-material component to be generated on a printing bed.

It is preferable for the printing bed to be heated.

The manufacturing method preferably comprises step d): cleaning the additive manufacturing installation after the consumption of a profile rod.

The manufacturing method preferably comprises step d): cleaning the additive manufacturing installation while a profile rod is being introduced, by reversing the profile rod and wiping the exit opening.

It is preferable in step d) for the heating duct and/or the exit opening to be cleaned.

It is preferable in step d) for the cleaning to take place by wiping thermoplastic residue from the additive manufacturing installation.

It is preferable in step d) for the wiping to take place by means of a wiping region which is preferably at least in part provided on the printing bed.

The invention achieves a profile rod for an additive manufacturing device, wherein the profile rod, when viewed in a profile rod cross section, in a first direction has a larger extent than in a second direction orthogonal to the first direction.

It is preferable for the profile rod cross section to be elliptic.

It is preferable for the profile rod to be configured so as to be solid.

It is preferable for the profile rod to be composed of a profile rod material which is selected from a group which includes thermoplastic plastic materials such as polyaryletherketone, in particular polyether ether ketone and/or polyether ketone ketone, resin, artificial resin, plastic material, fiber-reinforced plastic material, and/or prepreg material.

The invention furthermore proposes to use a profile rod as the material source for at least one material layer in an additive manufacturing method, wherein in the manufacturing method a preferably fiber-reinforced plastic-material component from a plurality of material layers is generated by layered melting.

It is to be noted that the enumeration of the method steps does not imply any sequence but serves only for easier reference.

Advantageous effects of the invention will be explained in more detail hereunder. It is to be noted that not all of the advantages have to be implemented in each embodiment. Advantages can also be implemented to varying degrees in different embodiments.

The basic concept of the invention is to eliminate the limitations which can result from the use of filament coils, in particular for fiber-reinforced filaments, and to overall improve the layered melting in particular with a view to the deposition rate such that a production of components at an industrial scale is reasonably possible.

To this end, it is proposed that pre-cut, pre-impregnated and reinforced fiber profile rods are used. For example, in the form of a square rod or a round rod, or else other suitable cross-sectional shapes. The typical diameter of the profile rods can be between approximately 2 mm and 20 mm, in particular between 5 mm and 15 mm. In principle however, the diameter of the profile rods is ly limited by the manageability thereof.

The pre-cutting of the bars enables the cutting unit to be removed from the printing head and thus to reduce the complexity of the additive manufacturing device such that also less maintenance is required during the printing process.

On account of the profile rods having a limited profile rod length, an almost arbitrary cut length can be used up to the point at which the handling of the profile rods becomes excessively difficult while endless fibers can still be used. Fibers which have a length that is identical to the dimensions of the component are preferably referred to as "endless" herein. In other words, when the fibers in one layer extend along the entire length of the layer, the fibers are presently referred to as endless.

The use of pre-impregnated materials, so-called prepregs, in a profile rod shape (for example thermoplastic unidirectional fiber-reinforced profiles, "UD profiles") enables the use of high-quality semi-finished products having a comparatively large diameter, while the low deposition rates which arise in the case of semi-finished products having a small diameter, such as with filament coils, for instance, can be avoided.

Furthermore, impregnating associated with the printing can likewise be avoided.

The materials used can be standard materials which can be used, for example, for the production of LFT chips and therefore are available at a comparatively low price.

Since the pre-tailored, in particular pre-cut, profile rods lead to the nozzle being entirely free of material at regular intervals, the nozzle can be cleaned more often and/or more carefully so as to remove degraded material, for example, and on account thereof to better avoid clogging.

Furthermore, the profile rod cross section of the profile rod, conjointly with the printing head orientation, can be adapted during the printing so as to minimize deviations in the fiber bending angle, or the fiber depositing angle, respectively, which can be created in relation to the cross section during the printing so that the risk of a fiber breakage can be reduced. This applies, in particular, to materials having a high elasticity modulus.

Adaptable profile cross sections make it possible to use a higher fiber volume content, in particular in the case of pre-impregnated fibers, whereby the quality is barely or not compromised.

Furthermore, the pre-tailoring, in particular the pre-cutting, of the profile rods can permit a simple material changeover while the method (that is to say, the 3D printing) is being carried out, for example a changeover from a material having a high elasticity modulus to a material with high-tensile fibers, from a reinforced material to a non-reinforced material, and/or from one type of reinforcement (including short fibers) to another type of reinforcement (or to another matrix system). Parts which previously have not been able to be produced in this way can thus be made.

Furthermore, the pre-tailored, in particular pre-cut, material can enable improved material quantity planning, so that an encapsulation of the printing material at the printer, for example in order to minimize environmental effects and/or to avoid the printing material drying again prior to each printing procedure, simply by removing the material for the specific printing procedure.

Furthermore, the pre-tailoring, in particular the pre-cutting, of the material can reduce the risk of an overflowing nozzle inlet and/or incomplete filling of the nozzle since tighter tolerances can be used in the semi-finished product in the form of profile rods than is the case in the filament coils to date.

Furthermore, the tighter tolerances can enable improved heating, in particular in comparison to methods which use plied yarn, and thus enable a more rapid and more uniform heating and thus melting of the thermoplastic components of the profile rods.

As opposed to other methods which provide impregnating of the fibers during the manufacturing, which usually requires the complete melting of the thermoplastic material in the nozzle, in the case of the method according to the invention this can be modified such that only partial melting of the semi-finished product is sufficient. Comparatively long and rigid UD profiles can thus also be used in the construction of the parts, in particular without the method having to be decelerated for the purpose of cooling.

Thermosetting polymer systems can presently also be pre-cut and inserted. The thermosetting polymer systems can also be cooled prior to being used or while being used such that the corresponding profile rods can remain highly viscous. Blends from thermosetting polymers having a high proportion of thermoplastic polymers can also be used. For example, a comparatively dry fibrous material having a sufficient proportion of binding agent can also be applied. The fiber bundles herein are preferably adhesively bonded to one another by way of a few percentage by volume of thermoplastic material such that the fiber bundles on account thereof can also be rendered as rigid as a stick.

Complex 3D structures can thus also be implemented which subsequently are only cured within a corresponding mold, or are infused and then cured.

This mechanism can furthermore be improved by accelerating the cooling process, for example by using a cooling mechanism such as, for instance, a cold-gas blower which is attached to the nozzle, or an active cooling circuit which can be accommodated in the nozzle. This approach can also be used for improving the complexity of 3D-printed free-form elements such that no support for cantilevered regions is required.

The combined use of nozzle heating units, printed volume heating, and active local cooling, either of the region of the printing space or of the nozzle, can also be used for improving process control, on account of which the properties of the printing result can be better controlled, for example parameters such as crystallinity, local surface strength, distortion, and the like.

The use of profile rods can furthermore be utilized for rotating the profile rods about the longitudinal axis thereof during the printing process such that a twist which is suitable for generating smaller radii can be generated in the printed filament.

As opposed to a continuous process with coils of semi-finished product, the printing material in the method described herein indeed ought to be changed after each profile rod; however, the profile rods may be pre-impregnated prior to printing and thus be configured so as to be comparatively rigid for thermoplastic matrix systems such that the profile rods can be more readily handled also in automated processes, for example by gripper arms.

Deviating from the prior art, the material used for printing is not provided in continuous form but in discrete portions, for example in the form of profile rods or profile bars. The bars are placed in an inlet guide until the bars are acquired and stored by an infeed mechanism which transports the profile bars to the heated nozzle. For example, the infeed mechanism can have wheels for infeeding. The profile rod melts in the nozzle and can be applied to a printing bed or a previously printed structure. The minimum printing length herein is usually limited by the length which on the printing bed, without requiring the infeed mechanism, after the profile rod has been pushed through the nozzle. Alternatively, the infeed mechanism can also be configured for pushing the profile rod along the entire path toward the nozzle tip, for example by means of a retractable and extendable pressure tappet.

Apart from the aforementioned measures, the following approach may also be used in the case of the present invention, the approach being combined with a variety of modifications in terms of the material (dissimilar material types, dissimilar cross sections, dissimilar diameters and the like) as well as with the method.

One modification, for example, lies in shaping the ends of the profile rods such that it is possible for the ends to be more easily introduced into the printing head.

Furthermore, a comparatively large quantity of thermoplastic material can be provided at the tip, or at an end, respectively, of the profile rod, so as to improve the printing quality at the beginning or the end, respectively, of each printing path for a given profile rod.

Additionally, a cleaning device can be added to the nozzle (for example a pressure tappet) and/or a nozzle shape which can be used conjointly with a wiping plate which permits the removal of degraded material after each printing cycle can be utilized.

A rapidly replaceable nozzle in an automated process can enable a rapid variation of the material cross section to be used.

Furthermore, heating settings which can be rapidly changed, and/or the inclusion of a cooling facility, can enable the cold-extrusion of the semi-finished product such that partial overprinting and subsequent extruding of non-melted UD profiles, followed by a further printed and molded section (and repetitions thereof) is enabled.

The use of non-circular cross sections enables improved heating (for example by virtue of smaller volume-to-surface ratios, or a smaller spacing between the wall and the heater for the same volume), likewise a higher degree of freedom in terms of design and smaller cross-sectional variations in terms of method-induced stresses and deformations. The quality can be improved on account thereof, for example because there is a less drastic difference between an internal radius and an external radius, this being able to be exploited so as to avoid any reorientation of the printed fibers such that the conditions across the cross section are better equalized and uniform quality prevails in the interior.

Furthermore, the printing head per se can be designed so as to have a reservoir of a plurality of profile rods, the reservoir being integrated in the printing head and thus enabling the replacement of the entire magazine. The magazine is filled such that one predefined part can be printed, for example.

BRIEF DESCRIPTION OF THE DRAWINGS

Exemplary embodiments will be explained in more detail by means of the appended schematic drawings, in which.

DETAILED DESCRIPTION OF THE PREFERRED EMBODIMENTS

Figure 2:
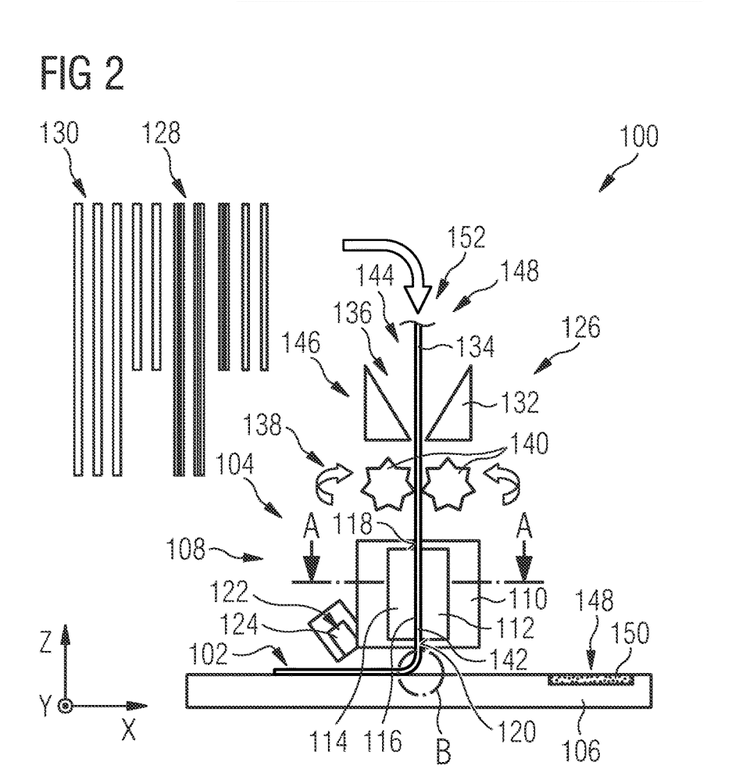
FIG. 2 shows an exemplary embodiment of an additive manufacturing device.

Reference hereunder is made to FIG. 2 which schematically shows an additive manufacturing device 100. The additive manufacturing device 100 is configured so as to generate a component 102 layer by layer. The component 102 is, in particular, a component of an aircraft. The component 102 can be a plastic-material component, or a fiber-reinforced plastic-material component, or a mixture thereof. The component 102 may also contain metal inserts.

The additive manufacturing device 100 comprises a printing head 104 which, in a manner known per se, is movable relative to a printing bed 106.

A plurality of components can be accommodated in the printing head 104. The printing head 104 can comprise an additive manufacturing installation 108. The additive manufacturing installation 108 is configured for generating the component 102 layer by layer on the printing bed 106. The additive manufacturing installation 108 can have a housing 110.

The additive manufacturing installation 108 contains a heating element 112 so as to heat a thermoplastic material to the melting point thereof, or beyond. The heating element 112 heats a heating region 114 which can have a heating duct 116 for the thermoplastic material. The heating duct 116 is delimited by an infeed opening 118 and the exit opening 120. The exit opening 120, in a manner known per se, can be provided on an exit nozzle (not illustrated in more detail here).

Furthermore, the additive manufacturing installation 108 can have a cooling installation 122. The cooling installation 122 is configured as a gas-flow cooler 124, for example. The cooling installation cools the thermoplastic material to below the melting point of the latter such that the thermoplastic material solidifies.

The additive manufacturing device 100 furthermore comprises an infeed installation 126. The infeed installation 126 is configured for feeding the thermoplastic material to the additive manufacturing installation 108.

The additive manufacturing installation furthermore comprises a material magazine 128 which is configured for receiving a plurality of profile rods 130. The profile rods 130 are pre-tailored so as to correspond to the component 102, for example in terms of the profile rod material, the profile rod length, the profile rod cross section, and/or the profile rod diameter. The profile rod 130 as a profile rod material can comprise a thermoplastic material or a thermoplastic plastic-material matrix and fibers embedded therein.

The material magazine 128 is configured and/or disposed such that the profile rods 130 can be successively retrieved from the material magazine 128 and introduced into the infeed installation 126. The infeed installation comprises an entrance portion 132. The entrance portion 132 is configured for supporting an introduced profile rod 134 in the radial direction of the latter. On account thereof, the introduced profile rod 134 can be positioned and/or aligned relative to the additive manufacturing installation 108.

The entrance portion 132 comprises an infeed duct 136 which can position and/or align the introduced profile rod. The infeed duct 136 is preferably configured as a cone which tapers in the direction toward the additive manufacturing installation 108.

The infeed installation 126 can furthermore comprise a profile rod drive installation 138. The profile rod drive installation acquires the introduced profile rod 134 in a force-fitting or form-fitting manner so as to move the introduced profile rod 134 along the axial direction thereof in the direction toward the additive manufacturing installation 108. The profile rod installation can have one or a plurality of drive wheels 140. The drive wheels 140 can be gear wheels or wheels with a smooth running surface. The profile rod drive installation 138 transports the introduced profile rod to the heating duct 116 and can participate in pushing the molten region 142 through the exit opening 120.

The infeed installation can moreover comprise an infeed tappet 144. The infeed tappet 144 can push the introduced profile rod 134 along the axial direction thereof in the direction toward the additive manufacturing installation 108. The infeed tappet 144 can furthermore be dimensioned such that the infeed tappet 144 pushes the profile rods 134 out of the material magazine 128 and introduces the profile rods 130 into the entrance portion 132.

The additive manufacturing device 100 can furthermore have a profile rod rotating installation 146. The profile rod rotating installation 146 is configured for rotating the introduced profile rod 134 about the longitudinal axis thereof. This can take place, for example, by rotating the additive manufacturing installation 108. It is also conceivable that the infeed tappet 144 acquires the introduced profile rod 134 in such a manner that the introduced profile rod 134 is rotated about the longitudinal axis thereof in a rotation of the infeed tappet 144. It is also conceivable that the entire printing head 104 rotates such that the introduced profile rod 134 is rotated about the longitudinal axis thereof. The additive manufacturing device 100 can furthermore have a cleaning installation 148. The cleaning installation 148 contains, for example, a wiper element 150 which can be integrated in the printing bed 106. The wiper element 150 is configured for wiping excess thermoplastic material from the additive manufacturing installation 108 and on account thereof to remove the excess material. This also applies to degraded thermoplastic material.

Alternatively or additionally, the cleaning installation 148 can have a cleaning tappet 152. The cleaning tappet 152 is configured for relieving the infeed installation and the additive manufacturing installation 108 of excess material. The cleaning tappet 152 can be introduced into the heating duct 116 through the infeed installation and thus push any residues of the introduced profile rod 134 out of the exit opening. If a wiper element 150 is provided in addition to the cleaning tappet 152, the wiper element can wipe off the thermoplastic material that has been pushed out.

In one preferred design embodiment, the infeed tappet 144 can also assume the function of the cleaning tappet 152.

Figure 3:
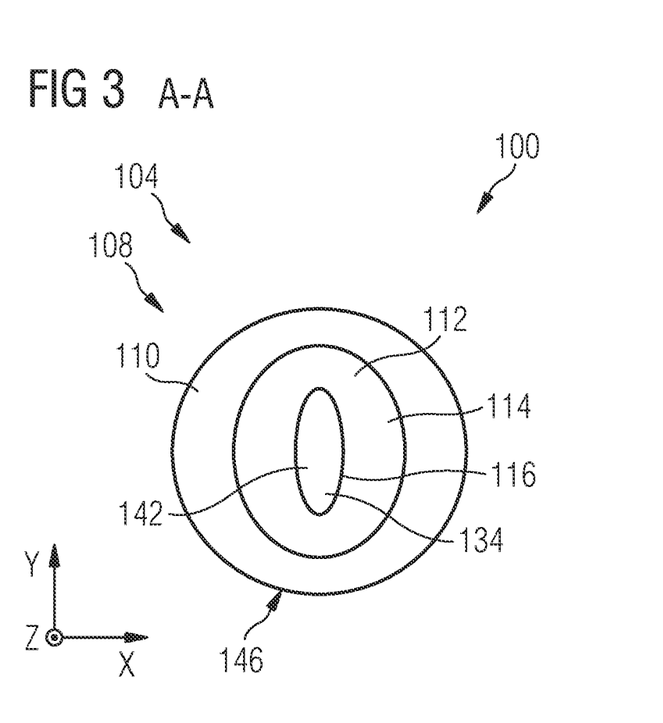
FIG. 3 shows a cross section along A-A from FIG. 2.
Figure 4:
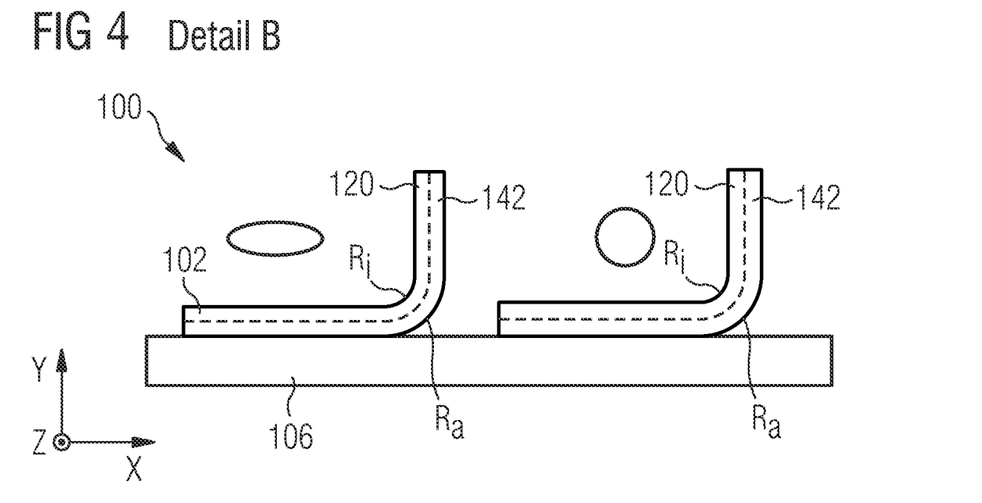
FIG. 4 shows a detailed view of the region B from FIG. 2.

Reference hereunder is made, in particular, to FIGS. 3 and 4.

As can be seen, the profile rod 130 in one direction has a larger extent than in a direction that is orthogonal to the former. The profile rod 130 preferably comprises a fiber-composite material having a matrix from a thermoplastic material and fibers embedded therein. The fibers are preferably aligned unidirectionally along the longitudinal direction of the profile rod 130.

As is illustrated in more detail, in particular in FIG. 3, the substantially elliptic cross section of the profile rod 130 leads to a comparatively small difference between the inner bending radius Ri and the outer bending radius Ra when the melted profile rod 142 is applied to the printing bed 106 and herein is bent by substantially 90°.

The difference between Ri and Ra is less in comparison to a circular cross section, such that lower variations in terms of stress arise and the fibers can be deposited without breaking. The larger extent in one direction than in the other direction furthermore enables the profile rod to be rotated about the longitudinal axis thereof and to thus influence the twisting of fibers.

For example, if the melted profile rod is to be placed about a curve of the component 102, the introduced profile rod 134 is rotated about the longitudinal axis thereof simultaneously with the bending movement of the printing head 104, such that the fibers are not twisted or broken, despite the curved movement of the printing head 104.

The functional mode of the additive manufacturing device 100 will be briefly explained in more detail hereunder.

It is assumed that a digitally constructed component 102 is present. The constructed component 102 by suitable software, which is known per se, is deconstructed (sliced) so as to form layers, and a control program for the additive manufacturing device 100 is established based on the data, such that the additive manufacturing device 100 can generate the component 102.

In the present invention, it is additionally determined from the component data which layers are to be formed from which material. By means of the size of this material layer it is determined how long each profile rod 130 in the material magazine has to be in order for the respective material layer to be generated. The profile rods 130 can be disposed according to their material and length, as is indicated in FIG. 1. However, it is preferable for the profile rods 130 to be sorted according to the material layers from which the component 102 is formed. Accordingly, the respective relevant profile rod 130 for each material layer is introduced into the infeed installation 126 so as to be subsequently printed.

This procedure is repeated until the entire component has been formed from the material layers which have been generated from the profile rods.

Additionally, the device can be cleaned at various times by means of the cleaning installation 148, prior to the printing being continued with a next profile rod.

Moreover, by virtue of the greater thickness of the profile rods in comparison to the conventional filament, the material can also be shaped in a cantilevered manner, or so as to have an overhang, respectively, if the cooling installation 122 is activated in a corresponding manner.

Overall, fiber-reinforced plastic-material components 102 which cannot be reasonably made using conventional methods, can be manufactured by way of the measures described herein. The reason therefor lies in that it is possible, by way of the present measures, to apply also fiber-reinforced plastic material without breaking or twisting fibers. Furthermore, the deposition rate for the plastic material substantially depends on the diameter of the profile rods used. For example, at diameters of approximately 10 mm for the pre-tailored profile rods 130, a deposition rate in the range of a few kilograms per hour could be achieved. This is an increase by a factor of approximately 100 in comparison to the conventional methods which depend on filament coils.

Summarizing, it is proposed that solid profile rods instead of the usual filament coils are used so as to render additive manufacturing methods such as 3D printing to be rendered useful for industrial applications such as aircraft manufacturing, and to enable a more rapid production of fiber-composite components. The additive manufacturing device, or the 3D printer which generates the component layer by layer, respectively, comprises a material magazine in which a plurality of profile rods are stored. The profile rods are pre-tailored and are adapted to the component layer by layer. The profile rods when printing are successively retrieved from the material magazine and by way of an infeed installation guided to the nozzle of the additive manufacturing installation and subsequently applied to the printing bed so as to form the component layer by layer.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Printing device
12 Printing head
14 Printing bed
16 Filament drive installation
18 Drive wheel
20 Coil 22 Filament
24 Hot end
26 Cutting device
28 Filament guide
30 Heating element
32 Exit nozzle
100 Additive manufacturing device
102 Component
104 Printing head
106 Printing bed
108 Additive manufacturing installation
110 Housing
112 Heating element
114 Heating region
116 Heating duct
118 Infeed opening
120 Exit opening
122 Cooling installation
124 Gas-flow cooler
126 Infeed installation
128 Material magazine
130 Profile rod
132 Entrance portion
134 Introduced profile rod
136 Infeed duct
138 Profile rod drive installation
140 Drive wheel
142 Molten region
144 Infeed tappet
146 Profile rod rotating installation
148 Cleaning installation
150 Wiper element
152 Cleaning tappet
$R_i$ Inner bending radius
$R_a$ Outer bending radius

The invention claimed is:

1. An additive manufacturing method for producing a component layer by layer, wherein said method comprises the following steps:
   a) pre-tailoring at least one profile rod to correspond to at least one material layer of a plurality of material layers which conjointly form the component;
   b) generating the material layer from the at least one pre-tailored profile rod by melting the at least one pre-tailored profile rod into a molten mass and applying the molten mass to a printing bed or a preceding material layer;
   c) carrying out step b) until the material layers form the component, wherein step b) comprises rotating the at least one pre-tailored profile rod about a longitudinal axis thereof; and wherein rotating the at least one profile rod about the longitudinal axis thereof comprises rotating an additive manufacturing installation.

2. The manufacturing method as claimed in claim 1, wherein a first profile rod from a first profile rod material, and a second profile rod from a second profile rod material which is dissimilar to the first profile rod material, are pre-tailored in step a).

3. The manufacturing method as claimed in claim 1, wherein a first material layer from a first profile rod is generated in step b), wherein a second material layer from a second profile rod is generated on the first material layer.

4. The manufacturing method as claimed in claim 1, wherein step b) comprises generating a first material layer from a first profile rod and generating, on the first material layer, a second material layer from a second profile rod.

5. The manufacturing method as claimed in claim 1, wherein step b) comprises positioning and/or aligning the at least one profile rod with an infeed opening of an additive manufacturing installation and/or a profile rod drive installation.

6. The manufacturing method as claimed in claim 5, wherein the at least one profile rod is positioned and/or aligned with a tapered infeed duct.

7. The manufacturing method as claimed in claim 1, wherein rotating the at least one profile rod about the longitudinal axis thereof comprises rotating an infeed tappet.

8. The manufacturing method as claimed in claim 1, wherein rotating the at least one profile rod about the longitudinal axis thereof comprises rotating a printing head.

* * * * *